United States Patent [19]
Grable

[11] 3,917,326
[45] Nov. 4, 1975

[54] INDUCED RECOVERY OF PARTICLES FROM SUB-SURFACE FORMATIONS

[75] Inventor: Donovan B. Grable, Long Beach, Calif.

[73] Assignee: Wasteland Reclamation Corporation, Long Beach, Calif.

[22] Filed: Nov. 12, 1973

[21] Appl. No.: 414,818

[52] U.S. Cl. .................... 299/8; 37/57; 175/60; 175/212
[51] Int. Cl.² .......................................... E21C 41/14
[58] Field of Search ............ 299/4, 8, 7, 9; 175/212; 37/57

[56] References Cited
UNITED STATES PATENTS

| | | | |
|---|---|---|---|
| 580,269 | 4/1897 | Gildea | 299/9 X |
| 686,467 | 11/1901 | Monberg | 299/8 |
| 2,057,691 | 10/1936 | Ranney | 299/9 X |
| 2,204,018 | 6/1940 | Kingsley | 299/4 X |
| 2,255,167 | 9/1941 | Hunn | 37/57 |
| 3,030,086 | 4/1962 | Donaldson et al. | 175/212 |
| 3,498,674 | 3/1970 | Matthews | 299/4 |
| 3,790,213 | 2/1974 | Grable | 299/8 |

*Primary Examiner*—Ernest R. Purser
*Attorney, Agent, or Firm*—William W. Haefliger

[57] ABSTRACT

Metallic particles are recovered from a sub-surface formation by:

a. producing a flow of liquid in the sub-surface formation extending between spaced sub-surface localities, and sufficient to displace metallic particles from within the formation to one of said localities, and b. retrieving metallic particles displaced to said one locality.

27 Claims, 5 Drawing Figures

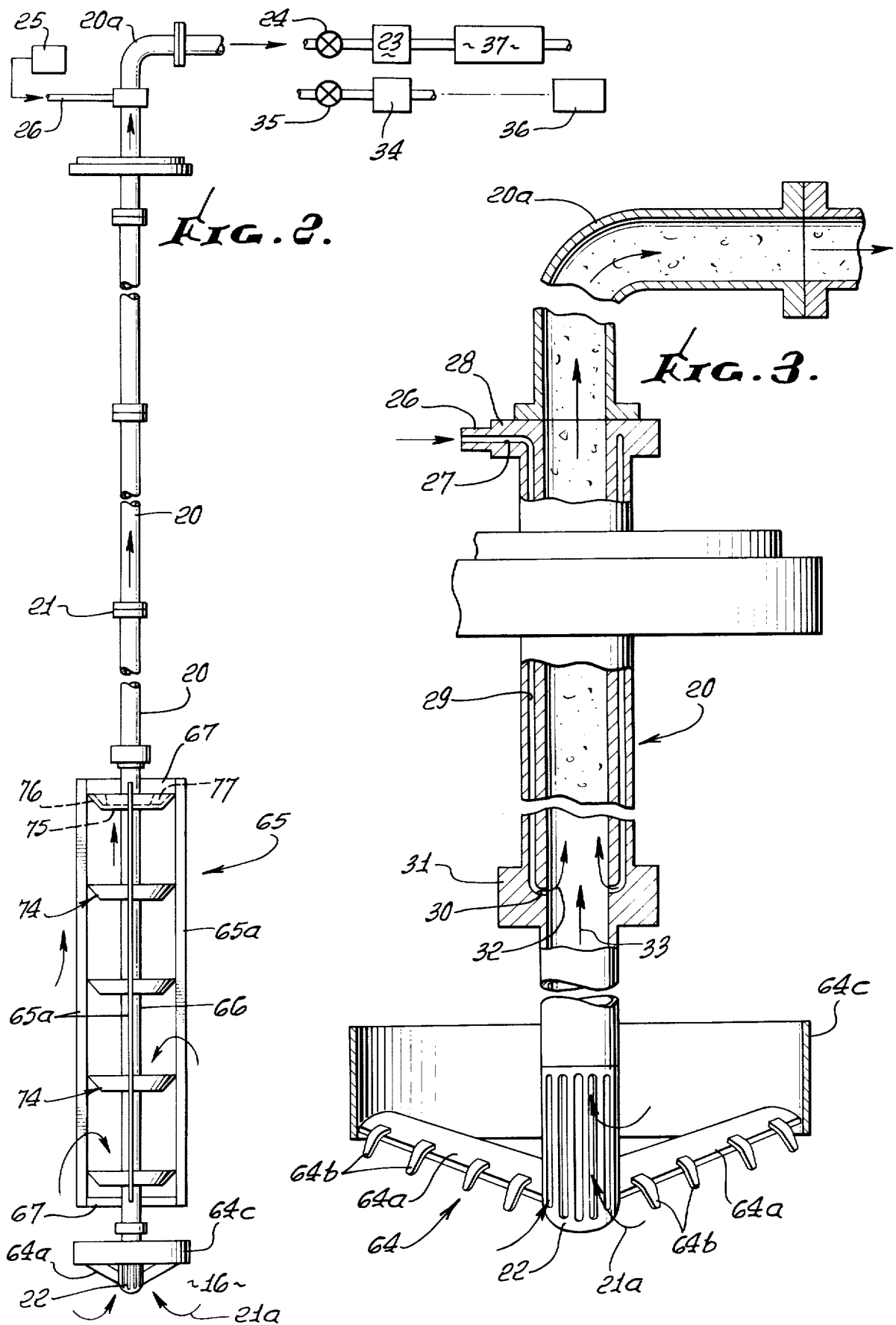

INDUCED RECOVERY OF PARTICLES FROM SUB-SURFACE FORMATIONS

BACKGROUND OF THE INVENTION

It is a major object of the invention to provide method and system enabling recovering of metallic particles, as for example precious metals, from inaccessible underground formation in a rapid, simple manner, with minimum disturbance to the in-place overburden.

Basically, and in its method aspects, the invention contemplates the displacement of metallic particles from within an underground formation to an underground locality from or at which the displaced particles may be recovered. As will appear, a flow of liquid is produced in the subsurface formation, as between spaced localities, the flow displacing the particles laterally to one or different particle retrieval localities. In one mode, a pressure differential is created between the localities to effect the underground flow, and as an example, liquid may be supplied to one locality and withdrawn from another, to create the pressure differential and effect the flow and particle displacement. In addition, the direction or directions of liquid or water flow may be intermittently reversed, to alternate the flow directions in the underground formation, for enhancing particle recovery. The liquid may consist of water or an aqueous lubricant mud, as will be seen.

It is a further object of the invention to enhance particle recovery through collection of particle in rotatable collectors carried by flow ducts, the latter being subjected to vertical oscillation, as will be seen. Also, non-metallic particles may be filtered or screened from liquid and metallic particles entering the duct or ducts for upward flow and recovery at the surface.

It is a still further object of the invention to provide for metallic particle recovery aided by reverse circulation via a duct extending to a single underground locality, as will be seen.

Finally, it is an object of the invention to provide system and apparatus functioning in a manner to achieve the above objectives.

These and other objects and advantages of the invention, as well as the details of illustrative embodiments, will be more fully understood from the following description and drawings, in which:

DRAWING DESCRIPTION

FIG. 2 is an enlarged elevation showing details of fluid supply means and metal particle collection apparatus;

FIG. 3 is an enlarged elevation, taken in section, showing details of construction of elements of the FIG. 2 embodiment;

Figure 5:
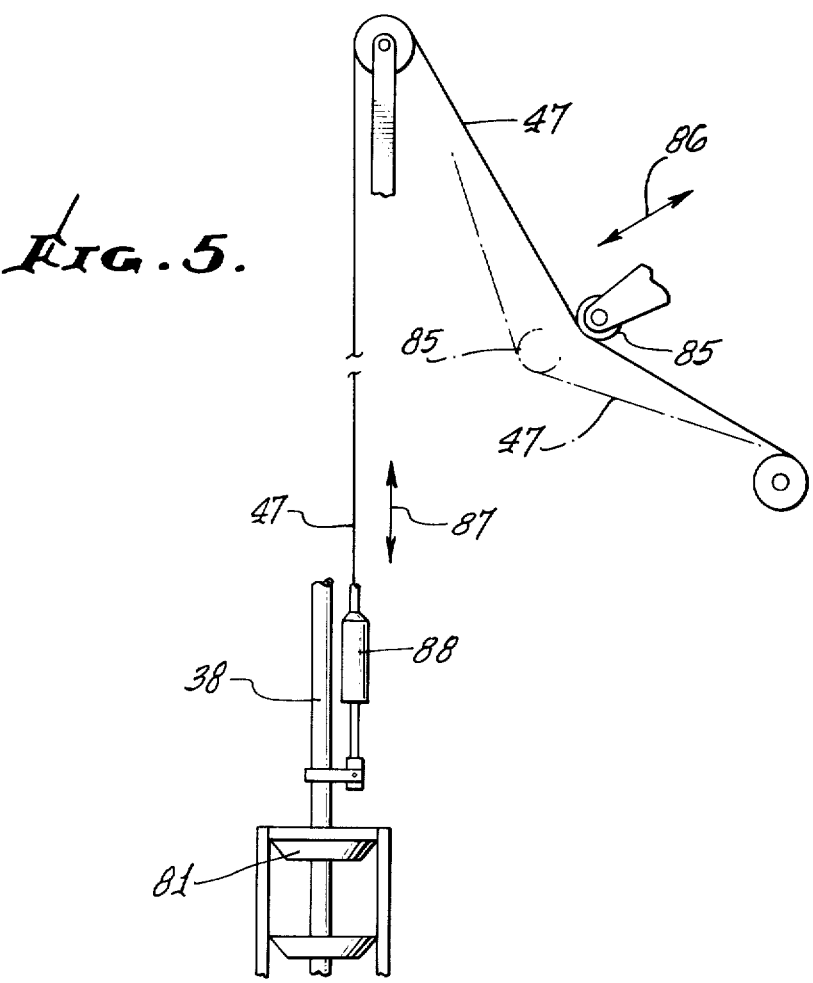

FIG. 5 an elevation showing means to vibrate the sub-surface particle collector up and down.

DETAILED DESCRIPTION

Figure 1:
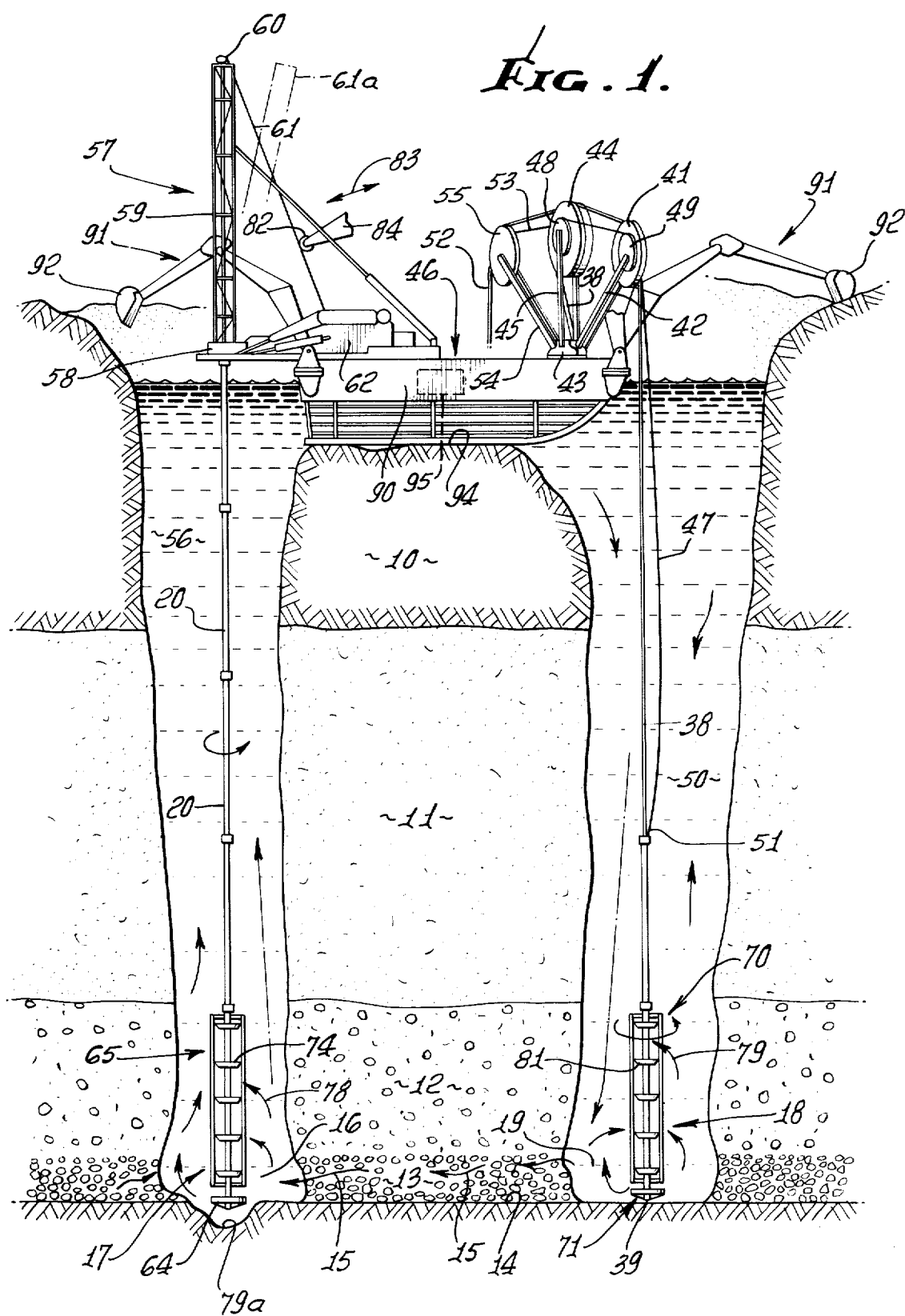
FIG. 1 is an elevation showing one preferred form of the invention.
Figure 4:
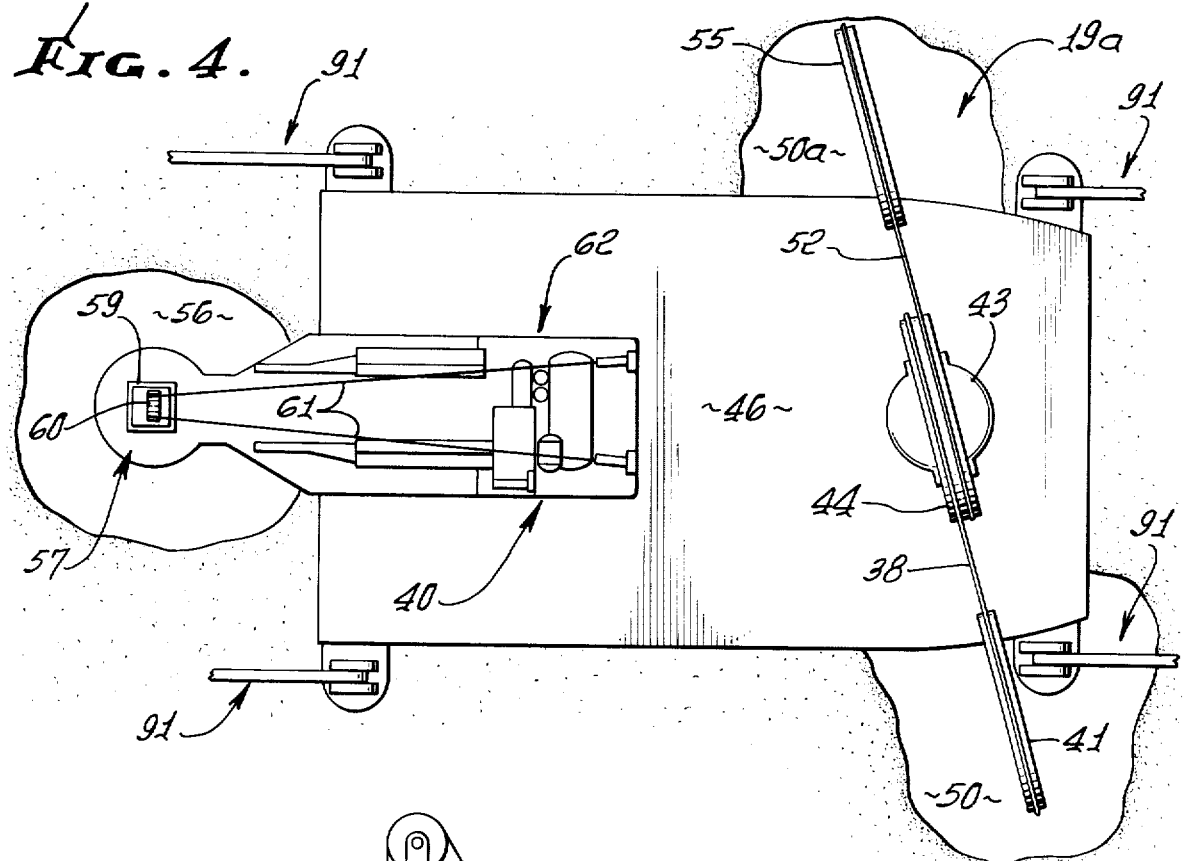
FIG. 4 is a plan view of surface apparatus seen in FIG. 1.

Reference is first made to FIG. 1 showing a sub-surface formation in section, and from which metallic particles (as for example precious metals such as gold, etc.) are to be recovered. Such terrain may typically include a rich soil layer 10, a layer 11 of soil, sand and gravel beneath layer 10, a layer 12 of heavier rocks, soil, sand and silt beneath layer 11, and a somewhat porous layer 13, as for example a layer of relatively heavy rocks beneath layer 12. A bedrock layer 14 may directly underlie the porous zone 13. Such formations are typically found in California and other areas, where gold particles have become naturally deposited in the porous layer 13 just above bedrock level, as for example from streams flowing downstream from a "mother lode" of gold ore. The recovery of the gold particles from zone 13, or similar underground porous zones, without dredging, and with minimum disturbance to the terrain, has presented a very substantial problem.

In accordance with the invention, a flow of liquid is produced in the formation in question, as for example as indicated by arrows 15 in porous layer 13, and sufficient to dislodge and displace metallic particles from the interstices within the formation. The flow is typically produced between spaced underground localities so that the particles are carried to one of such localities, and the particles are then retrieved. The one locality to which the particle are displaced, for retrieval, may be a locally disturbed locality as generally indicated at 16, and another or other localities from which the flow has come may be disturbed or undisturbed, the former term referring to substantial disruption of the formation material as for example by equipment generally indicated at 17 and 18. For example, the other locality may be at 19, and disturbed by equipment 18, or it may be within the undisturbed formation 13. Further, the flow producing step may encompass the creation of a pressure differential between liquid at locality 16 and at other outlying localities, as for example may be effected by relatively reducing the liquid pressure at locality 16, relatively increasing the liquid pressure at another or other outlying localities, as for example at locality 19, or both.

Referring in more detail to FIG. 1, a duct is provided to extent downwardly from the surface to terminate at or near locality 16, the illustrated example comprising pipe lengths 20 coupled at 21. Extending the description to FIG. 2, means is provided to effect flow of liquid, as for example an aqueous slurry containing sand, silt and metal particles, upwardly in the duct as indicated by arrows 21a, and a filter or strainer 22 may be carried at the lower terminal of the pipe to remove larger material (such as gravel and small rocks) from the upward flow. Such flow effecting means may comprise a suitable pump 23 at the surface, to which the pipe upper end extent 20a is suitably connected as via a valve 24. Upward flow may be enhanced or facilitated as by introduction of gas such as air into the upwardly flowing stream in the pipe; to this end, air may be introduced from a source 25 via line 26, duct 27 in collar 28, duct 29 in the pipe 20, and duct 30 in collar 31 for injection at 32 into the upward flow 33 at a sub-surface level. See FIG. 3 in this regard.

Means may also be provided to effect downward flow of liquid such as water or suitable mud or other flowing substance via pipe 20 to locality 16 and then into the surrounding formation to aid the metal particle recovery.

Such means may for example include a surface pump 34 connectible with pipe extent 20a via valve 35, a source of such liquid being indicated at 36. As will appear, the downward and upward flow of liquid in pipe 20 may be carried out intermittently (descriptively referred to as "huff and puff") to maximize metal particle recovery, and for this purpose the downwardly injected liquid may comprise a lubricant mud, as for example Bentonitic mud. FIG. 2 also shows a suitable separator 37 for receiving the upward flow of water, metallic particles and soil particles, and for separating the metal particle therefrom. Such a separator may include riffle or other conventional separation structure.

Referring back to FIG. 1 a second duct may extend underground to supply liquid to zone 19, for flow toward zone 16 via the underground porous formation 13. One such duct is indicated at 38 as comprising a flexible hose, the duct terminating openly at 39 in zone 19. Means may be provided at 40 for supplying liquid such as water to the duct 38 to flow downwardly to zone 19, or alternatively to withdraw water upwardly from zone 19 via the duct as for example when water is supplied downwardly to zone 16 via pipe 20. Under the latter conditions, flow is reversed through the formation 13, to aid in loosening and retrieving the metallic particles in the inaccessible formation.

In this regard, hose 38 may be trained over a sheave 41 at the outboard end of a swingable boom 42 the lower end of which is pivotally supported at 43. The hose also passes over a sheave 44 on an upstanding mast 45, to be directed downwardly for storage on a carrier craft or vehicle 46. Similar hose reeling structure including winches and power drives is described in my U.S. Pat. No. 3,761,132. A wire line 47 passes over auxiliary sheaves 48 and 49 and downwardly in a water filled vertical passage or swath 50 in the earth to connect to the hose as at 51, for guiding the hose, and for oscillating it up and down, in the manner to be described. Another hose and wire line are indicated at 52 and 53, with associated boom and sheave structure 54 and 55, for use in forming another subterranean passage 50a and zone 19a corresponding to passage 50 and zone 19, and to be used in a similar manner in relation to zone 16, for removing metal particles from another portion of the underground formation.

Pipe 20 is shown as suspended in vertical, water filled passage 56 as from the equipment designated at 57. The latter may include a rotary table 58 for rotating the pipe in the same manner that oil well drill pipe is rotated as it is progressively lowered. In this regard, the top pipe stand is connected to a kelly projecting in a mast 59 at the surface, and elevator means is carried by the mast to elevate and lower the pipe via the kelly. Such elevator means may comprise a pulley 60 at the top of the mast to support cable 61 extending from the draw works 62 over the pulley and downwardly in the mast to a swivel supporting the kelly. In addition, structure may be provided to tilt the mast, as for example between solid line position and the broken line position as at 61a, for directing drilling and cutting of the passage 56, as by means of cutter structure 64 at the lower end of the pipe, and reamer structure 65. The example of the former seen in FIG. 3 includes cutter blades 64a and teeth 64b, the outer ends of the blades attached to a cutter ring 64c. Reamer structure 65 may include a series of circularly spaced, vertically extending blades 65a joined at their opposite ends to a sleeve 66 on the pipe via web members 67. Suitable mast tilting structure is described in my copending application Ser. No. 380,362 filed July 18, 1973.

Similar reamer structure 70 and bottom cutter 71 may be incorporated in equipment 18 at locality 19. Rotation of the cutter and reamer structure may there be effected as by a turbine drive as described in the above application Ser. No. 380,362, the turbine rotor driven by water pressure exerted by water flowing downwardly in hose 38.

A vertical series of metal particle collectors 74 is located above the cutter 64 and connected with pipe 20 via sleeve 66. The collector trays have flat bottom plates 75, upwardly and outwardly inclined walls 76, and suitable interior baffles 77. The latter drive the contents of the collectors at the same angular velocity as the collectors to assure centrifugal displacement and outward discharge over walls 76 of all but the segregatable heavy particles, such as gold or other metals. As water or other liquid flows from the formation 13 into either of the localities 16 and 19, certain of the metal particles borne by such water may swirl and be carried upwardly as indicated by arrows 78 and 79 for collection in the trays. Rotation of the latter then removes silt and sand from the trays so that maximum collection of metal particle may be achieved. This of course is in addition to retrieval of particles upwardly in the ducts (pipe 20 and hose 88) as previously referred to. In this regard, cutter 64 may form a "bell" hole 79a in the formation to aid in the directing of water circulation as well as metal particle retrieval and collection. Thus, as particles settle out into the bell hole, the radial blades stir them up for upward entrainment by the water, and retrieval. Collector trays 74 may have screen covers to prevent rock collection therein. Similar collectors may be provided at locality 19, as indicated at 81, and may be rotated, by the turbine drive as referred to.

Up and down oscillation of the collectors 74 on pipe 20, to aid particle collection, may be achieved by rapid deflection of the cable 61 at the surface. For this purpose, an idler 82 may be caused to engage the cable and be rapidly moved in the directions of arrows 83, as by an arm or actuator 84 carried by vehicle 46. Similarly, FIG. 5 shows an idler 85 engaged with wire line 47 at the surface, and movable as indicated by arrows 86 to deflect or oscillate the line, displacing the hose 38 up and down as indicated by arrows 87. The line 47 may be connected to the hose through a "jar" unit 88 coupled to the hose at 89. The jar serves to produce sharp impacts as the wireline is oscillated, and may for example have the construction of Camco Company Wireline Stroke Jar Assembly No. 15328. The mast 59 shown in FIG. 1 may have the general construction of DM–4 Drillmaster, as product of Ingersoll-Rand Company, Phillipsburg, N.J.

Vehicle 46 may include a floatable hull 90, terrain engaging articulated legs 91 carried by the hull to advance it over rugged terrain such as hills, swamps, shallow lakes, etc., and controls for moving such legs. See in this regard my U.S. Pat. No. 3,761,132, and application Ser. No. 380,362 reference to above. Back hoes 92 are provided at the leg terminals to engage the terrain for advancing the vehicle, and controllably tilting it as for example on support surface 94. Water standing in the passages 50 and 56 may be pumped as by means of equipment 95 for re-supply to the ducts 20 and 38.

What is claimed is:

1. In the recovering of metallic particles from a sub-surface formation, the process that includes
   a. rotatably cutting downwardly into the sub-surface formation to at least one of two spaced sub-surface localities and producing a flow of liquid in the sub-surface formation extending between said spaced sub-surface localities, and sufficient to displace metallic particles from within the formation to one of said localities, and b. retrieving metallic particles displaced to said one locality, said retrieving step including separating at said one locality said metallic particles from loose non-metallic material and also effecting flow of liquid with metallic particles carried therein in a stream upwardly to the surface.

2. The process of claim 1 wherein said producing step includes creating a pressure differential between liquid at said one locality and liquid at another of said localities.

3. The process of claim 1 wherein said producing step includes reducing the liquid pressure at said one locality.

4. The process of claim 3 wherein said reduction of liquid pressure at said one locality is effected by withdrawing liquid upwardly therefrom.

5. The process of claim 3 wherein said producing step includes increasing the liquid pressure at another of said localities spaced from said one locality.

6. The process of claim 4 wherein said increase of the liquid pressure at said other locality is effected by delivering water in a pressurized stream thereto.

7. The process of claim 5 wherein said retrieving step includes providing a collector at said other locality to collect metallic and non-metallic particles, and rotating the collector at said other locality to effect centrifugal displacement of non-metallic particles from the collector.

8. The process of claim 1 wherein said effecting step includes introducing gas into the sub-surface stream.

9. The process of claim 1 including providing a duct to receive the stream for said upward flow, and filtering oversize granules from the stream flowing into the duct.

10. The process of claim 9 that includes intermittently flowing liquid downwardly in said duct to said one locality for flow into the formation.

11. The process of claim 10 wherein the metallic particles include gold particles.

12. The process of claim 1 wherein said separation step includes providing a collector at said one locality to collect metallic and non-metallic particles and rotating the collector at said one locality to effect centrifugal displacement of non-metallic particles from the collector.

13. The process of claim 11 wherein said retrieving step also includes displacing the collector up and down.

14. The process of claim 1 wherein said metallic particles consist of precious metal.

15. The process of claim 1 including the step of intermittently effecting flow of liquid away from said one locality into said formation.

16. In the recovering of metallic particles from a sub-surface formation, the steps that include a. rotatably drilling downwardly into the formation to a sub-surface locality near which said particles are found, and laterally reaming the formation during and above the locus of said drilling to enlarge said locality, b. effecting upward flow of water in a stream from said locality to the surface in a manner to cause upward displacement of the particles by the stream to the surface, and c. filtering at said locality oversize granules from the stream.

17. The process of claim 16 that includes providing a duct to receive the stream for said upward flow, said filtering step carried out to filter oversize granules from the stream flowing into the duct.

18. The process of claim 16 that includes intermittently flowing water downwardly to said locality for flow into said formation.

19. The process of claim 16 wherein said effecting of upward flow includes introducing gas into the sub-surface stream.

20. In a system for recovering metallic particles from a sub-surface formation, the combination that comprises a. first means for producing a flow of liquid in the sub-surface formation situated between spaced sub-surface localities and sufficient to displace metallic particles from within the formation to one of said localities, b. other means at said locality to effect separation of loose non-metallic material from the metallic particles displaced to said locality, c. said first means including ducts extending underground to openly terminate at said localities, and apparatus at the surface to supply liquid to one of the ducts and withdraw metallic particles in a stream of liquid from the other duct, and d. rotary cutting means at the lower end of one of the ducts, and actuator means to effect displacement of the cutting means both downwardly and laterally to loosen the formation at and about one of said localities.

21. The combination of claim 20 wherein said other means includes a filter proximate the lower terminus of at least one of the ducts.

22. The combination of claim 20 wherein said other means comprises an upwardly opening collector carried on one of the ducts to be rotated for centrifugally displacing non-metallic material outwardly away from metallic particles received in the collector.

23. The combination of claim 20 wherein said actuator means also includes means to oscillate said one duct and said collector up and down.

24. The combination of claim 20 wherein said cutting means includes a rotary reamer carried at the lower end of said one of the ducts.

25. In a system for recovering metallic particles from a sub-surface formation, the combination that comprises a. first means for producing a flow of water in the sub-surface formation and between spaced sub-surface localities and sufficient to displace metallic particles from within the formation to at least one of said localities, said means including ducts extending underground to terminate at said localities and in water passing communication therewith, b. said first means including means to alternately supply water to, and withdraw liquid from, at least one of the ducts, c. separator means for separating non-metallic material from metallic particles displaced to at least one of said localities, d. and actuator means to oscillate said one duct up and down and laterally.

26. In a system for recovering metallic particles from a sub-surface formation, the combination that includes:

a. a duct extending from the surface downwardly to terminate at an underground locality, b. means to effect flow of water alternately upwardly and downwardly in the duct,
c. collector means carried on the duct to extend externally thereof for rotation so as to centrifugally displace non-metallic material outwardly away from metallic particles received in the collector means, and
d. actuator means to oscillate the duct and collector means upwardly and downwardly and also laterally.

27. The system of claim 26 including means at the surface to separate metallic particles from the water withdrawn from the duct.

* * * * *